(12) United States Patent
Park (10) Patent No.: US 7,304,460 B2
(45) Date of Patent: Dec. 4, 2007

(54) SMART START-UP CIRCUIT FOR SWITCHING REGULATORS

(75) Inventor: Sangbeom Park, Tracy, CA (US)

(73) Assignee: ANA Semiconductor, Tracy, CA (US)

( * ) Notice: Subject to any disclaimer, the term of this patent is extended or adjusted under 35 U.S.C. 154(b) by 317 days.

(21) Appl. No.: 11/038,931

(22) Filed: Jan. 18, 2005

(65) Prior Publication Data

US 2006/0158167 A1     Jul. 20, 2006

(51) Int. Cl.
*G05F 1/40*     (2006.01)
(52) U.S. Cl. ...................... 323/282; 323/901
(58) Field of Classification Search ................. 363/49; 323/282, 901; 327/538, 540, 541, 543
See application file for complete search history.

(56) References Cited

U.S. PATENT DOCUMENTS

| | | | | |
|---|---|---|---|---|
| 4,460,951 A | * | 7/1984 | Fenter et al. | ................. 363/49 |
| 4,928,218 A | * | 5/1990 | Kluttz | .......................... 363/37 |
| 5,216,586 A | * | 6/1993 | Saito | ........................... 363/49 |
| 5,867,013 A | * | 2/1999 | Yu | ............................. 323/314 |
| 7,053,690 B2 | * | 5/2006 | Utsuno | ....................... 327/407 |
| 7,129,684 B2 | * | 10/2006 | Park | ........................... 323/282 |

* cited by examiner

*Primary Examiner*—Adolf Berhane

(57) ABSTRACT

The smart start-up circuits basically include a sensor, two stacked PMOS transistors, two stacked NMOS transistors, and a feedback line. If the sensing voltage does not reach the expected voltage compared to the midpoint voltage of the sensor, the output voltage of the sensor turns on the corresponding transistor, which provides a current to its output until the voltage at feedback reaches the midpoint voltage. The time to reach the midpoint voltage at a load is simply equal to the charge stored at the load divided by the current, which can be scaled by a device aspect ratio of the transistor. Consequently, all smart start-up circuits provide an initial output voltage level closer to the output voltage level that reaches the equilibrium according to schedule.

17 Claims, 7 Drawing Sheets

SMART START-UP CIRCUIT FOR SWITCHING REGULATORS

FIELD OF THE INVENTION

The present invention relates to the field of switching regulator and more particularly to smart start-up circuit for switching regulators.

BACKGROUND ART

Switching regulator is a vitally important device. Switching regulators are building blocks used extensively in power systems, industry, motor, communication, networks, digital systems, consumer electronics, computers, and any other fields that require high efficient voltage regulating functions.

Figure 1:
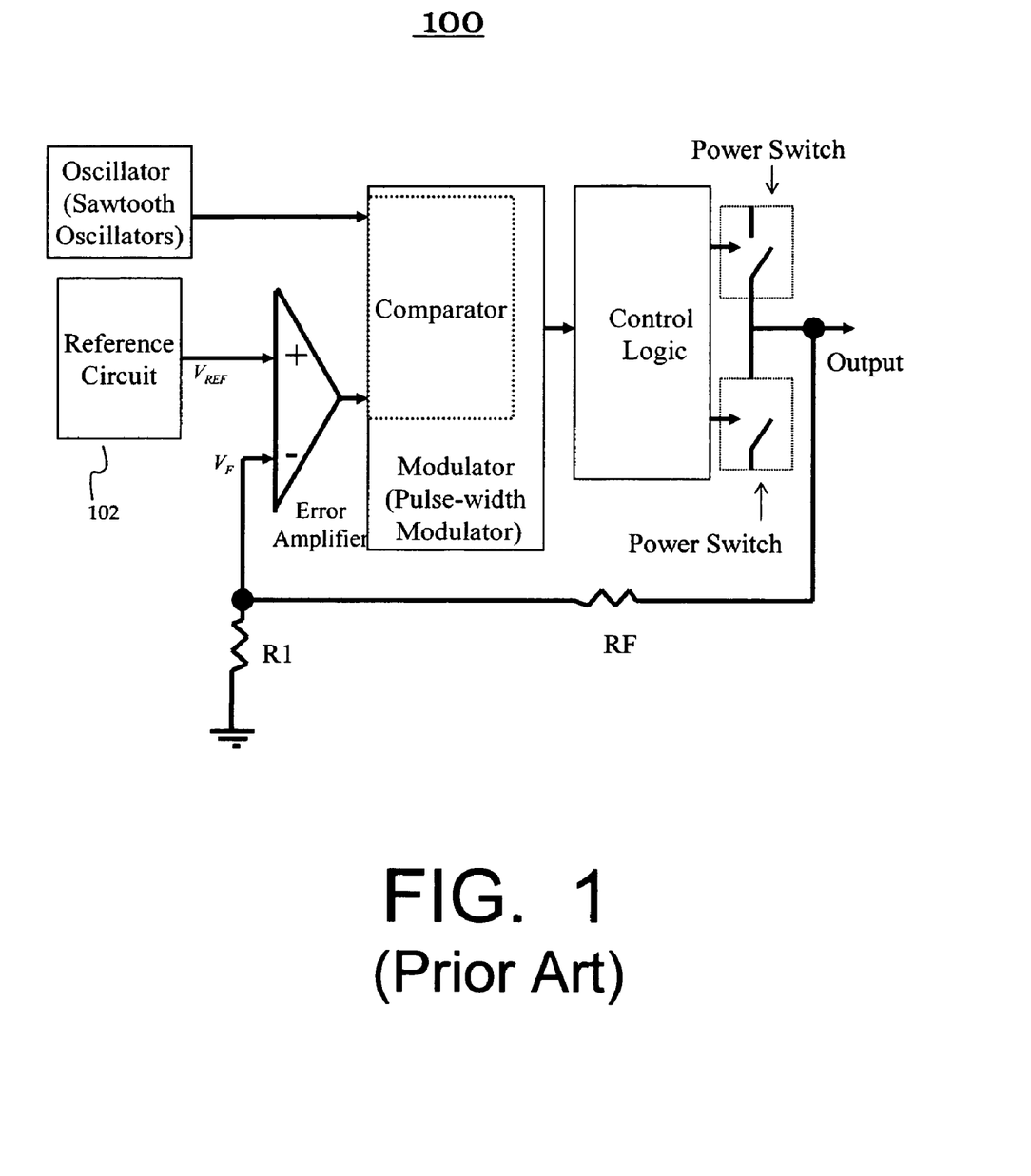
FIG. 1 illustrates a block diagram of a conventional switching regulator (i.e., DC-TO-DC converter).

Switching regulators (i.e., DC-TO-DC converters) can provide output voltages which can be less than, greater than, or of opposite polarity to the input voltage. Prior Art FIG. 1 illustrates a basic architecture of a conventional switching regulator 100. The conventional switching regulator 100 basically consists of an oscillator, a reference circuit 102, an error amplifier, a modulator including a comparator, resistors, and a control logic circuit. Control technique of switching regulators has typically used two modulators: a pulse-width modulator and a pulse-frequency modulator. The output DC level is sensed through the feedback loop including two resistors. An error amplifier compares two input voltages: the sampled output voltage and the reference voltage. The output of the error amplifier is compared against a periodic ramp generated by the saw tooth oscillator. The pulse-width modulator output passes through the control logic to the power switch. The feedback system regulates the current transfer to maintain a constant output voltage within the load limits. In other words, it insures that the output voltage level reaches the equilibrium. When the output voltage level reaches the equilibrium, $V_F$ is equal to $V_{REF}$, as shown in Prior Art FIG. 1.

However, it takes a vast amount of time until the output voltage level reaches the equilibrium from an initial condition after the switching regulator of Prior Art FIG. 1 starts. Therefore, power and time are consumed until the switching regulator's output voltage level reaches the equilibrium. In addition, it takes a long time to simulate and verify the conventional switching regulator 100 before fabrication since its simulation time is absolutely proportional to time that is required the switching regulator's output voltage level to reach the equilibrium. Hence, this long simulation adds additional cost and serious bottleneck to design time-to-market. In other words, the slow start-up of the switching regulator increases design simulation time. For these reasons, the conventional switching regulator 100 of Prior Art FIG. 1 is very inefficient to implement in system-on-chip (SOC) or integrated circuit (IC).

Thus, what is needed is a fast starting-up switching regulator that can be highly efficiently implemented with a drastic improvement in a very fast start-up time, start-up time controllability, performance, time-to-market, power consumption, power and time management, efficiency, cost, and design time. It is highly desirable to enable all of the switching regulators' output voltage levels to reach the equilibrium immediately for much higher power efficiency or according to schedule. The present invention satisfies these needs by providing five embodiments.

SUMMARY OF THE INVENTION

The present invention provides five types of the smart start-up circuits for switching regulators. The smart start-up circuits provide an initial output voltage level closer to the output voltage level of switching regulator that reaches the equilibrium according to schedule. The basic architecture of the smart start-up circuits consists of a sensor, two stacked PMOS transistors, two stacked NMOS transistors, and a feedback line. The sensor senses a voltage at its input. If the sensing voltage does not reach the expected voltage compared to the midpoint voltage of the sensor, the output voltage of the sensor turns on the corresponding transistor, which provides a current to its output until the output voltage reaches the midpoint voltage. The time to reach the midpoint voltage at the load is simply equal to the charge stored at the load divided by the current, which can be scaled.

Consequently, all smart start-up circuits provide a significant reduction in the difference between the initial output voltage level and the expected output voltage level in order to overcome serious drawbacks simultaneously. The smart start-up time of the present invention enables all systems to be managed in terms of power, stand-by time, and start-up time. The present invention provides five different embodiments which achieve a drastic improvement in a very fast start-up time, start-up time controllability, performance, time-to-market, power consumption, power and time management, efficiency, cost, and design time.

BRIEF DESCRIPTION OF THE DRAWINGS

The accompanying drawings, which are incorporated in and form a part of this specification, illustrate five embodiments of the invention and, together with the description, serve to explain the principles of the invention.

Prior Art

DESCRIPTION OF THE PREFERRED EMBODIMENTS

In the following detailed description of the present invention, five types of the smart start-up circuits, numerous specific details are set forth in order to provide a thorough understanding of the present invention. However, it will be obvious to one skilled in the art that the present invention may be practiced without these specific details. In other instances, well known methods, procedures, CMOS digital gates, components, and metal-oxide-semiconductor field-effect transistor (MOSFET) device physics have not been described in detail so as not to unnecessarily obscure aspects of the present invention.

Figure 2:
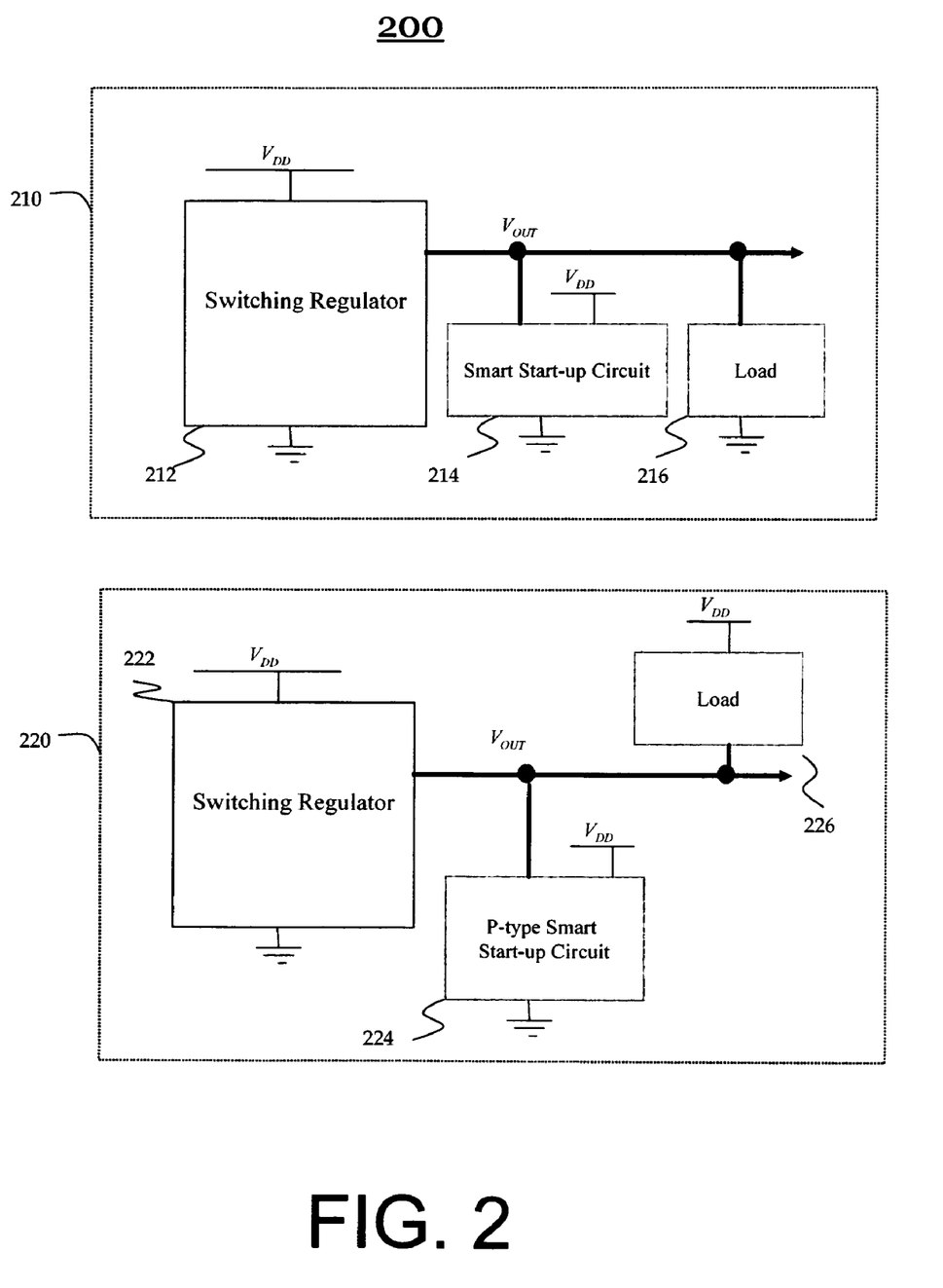
FIG. 2 illustrates a block diagram of two types of smart start-up circuits for switching regulator in accordance with the present invention.

FIG. 2 illustrates two types of the smart start-up circuits for switching regulators in accordance with the present invention. One type of the smart start-up circuit is applied for switching regulators driving a load 216 connected between $V_{OUT}$ and ground, as seen in the switching regulator system 210 shown in FIG. 2. The other type of the smart start-up circuit called "p-type smart start-up circuit" is applied for switching regulators driving a load 226 connected between $V_{DD}$ and $V_{OUT}$, as seen in the switching regulator system 220 shown in FIG. 2. To reduce the difference between the initial output voltage level and the expected output voltage level of the switching regulator, the output of all the smart start-up circuits is coupled to the output terminal of switching regulators, as shown in FIG. 2. The switching regulator 212 represents all types of the switching regulators (i.e., DC-TO-DC converter) driving a load 216 connected between $V_{OUT}$ and ground without regard to the types of switching regulators because the applications of the smart start-up circuit 214 are independent of architectures and types of switching regulators. The switching regulator 222 represents all types of the switching regulators (i.e., DC-TO-DC converter) driving a load 226 connected between $V_{DD}$ and $V_{OUT}$ without regard to the types of switching regulators because the applications of the p-type smart start-up circuit 224 are independent of architectures and types of switching regulators. If loads 216 and 226 are multiple-order, then they will be approximated to the first-order load with neglecting resistor and inductor in the load for simplicity.

Figure 3:
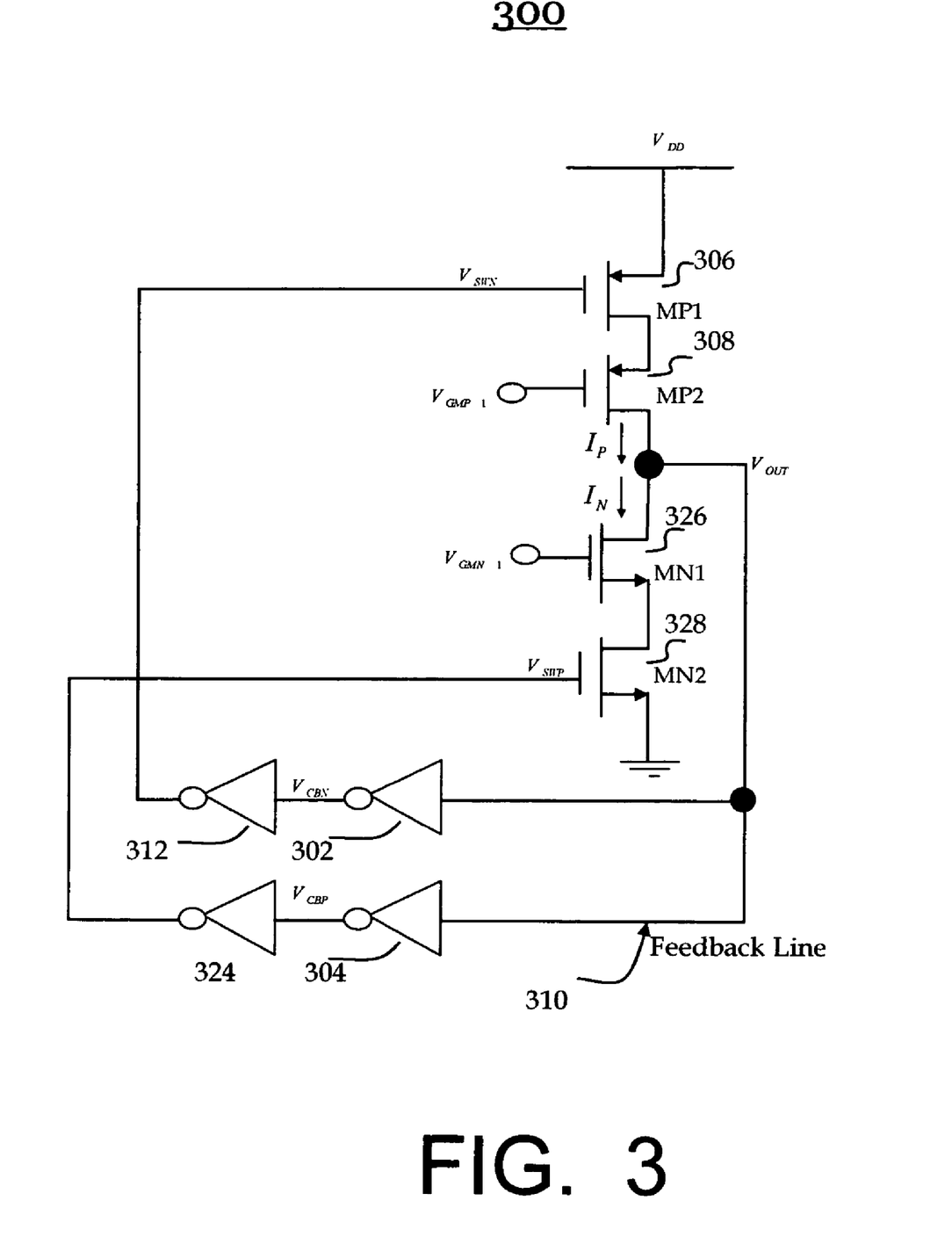
FIG. 3 illustrates a circuit diagram of a basic smart start-up circuit according to the present invention.

FIG. 3 illustrates a basic smart start-up circuit according to the present invention. This basic smart start-up circuit 300 does not have power-down mode in order to show the fundamental concept of the invention clearly. The basic smart start-up circuit 300 is a feedback circuit that consists of lower-voltage sensing inverters 302 and 312 (i.e., an even number of inverters), higher-voltage sensing inverters 304 and 324 (i.e., an even number of inverters), two stacked PMOS transistors 306 and 308, two stacked NMOS transistors 326 and 328, and a feedback line 310. The gate terminal of a PMOS transistor 308 is connected to a proper fixed-bias voltage (not shown) or ground (e.g., "0", low, etc.). The gate terminal of a NMOS transistor 326 is connected to a proper fixed-bias voltage (not shown) or power supply voltage (e.g., $V_{DD}$, "1", high, etc.).

It is assumed that the output of the basic smart start-up circuit 300 is at ground. Since the first lower-voltage sensing inverter 302 initially senses a voltage less than the lower midpoint voltage of the first lower-voltage sensing inverter 302, the output voltage of the second lower-voltage sensing inverter 312 is low enough to turn on the PMOS transistor 306. At the same time, the output voltage of the second higher-voltage sensing inverter 324 is low enough to turn off the NMOS transistor 328. Thus, the PMOS transistor 306 provides a current (i.e., $I_P$) to the output until the output voltage (i.e., $V_{OUT}$) goes up to the lower midpoint voltage of the first lower-voltage sensing inverter 302. The time to reach the lower midpoint voltage at the load connected between $V_{OUT}$ and ground is as follows:

$$\Delta t = \frac{V_M C_P}{I_P}$$

where $V_M$ is the lower midpoint voltage determined by the device aspect ratios of the first lower-voltage sensing inverter 302 and $C_P$ is the value of the capacitor in the load. Also, assuming that $V_M$ is closer to the output voltage level that reaches the equilibrium in switching regulators, the start-up time of the switching regulators is approximately given by $$\frac{V_M C_P}{I_P}$$

This start-up time is varied by the current $I_P$ depending on the size of the PMOS transistor 306.

It is assumed that the output of the basic smart start-up circuit 300 is at power supply. Since the first higher-voltage sensing inverter 304 initially senses a voltage greater than the higher midpoint voltage of the first higher-voltage sensing inverter 304, the output voltage of the second higher-voltage sensing inverter 324 is high enough to turn on the NMOS transistor 328. At the same time, the output voltage of the second lower-voltage sensing inverter 312 is high enough to turn off the PMOS transistor 306. Thus, the NMOS transistor 328 provides a current (i.e., $I_N$) to the output until the output voltage (i.e., $V_{OUT}$) goes down to the higher midpoint voltage of the first higher-voltage sensing inverter 304. The time to reach the higher midpoint voltage at the load connected between $V_{OUT}$ and power supply is as follows:

$$\Delta t = \frac{(V_{DD} - V_{M(H)}) C_P}{I_N}$$

where $V_{M(H)}$ is the higher midpoint voltage determined by the device aspect ratios of the first higher-voltage sensing inverter 304 and $C_P$ is the value of the capacitor in the load. Also, assuming that $V_{M(H)}$ is closer to the output voltage level that reaches the equilibrium in switching regulators, the start-up time of the switching regulators is approximately given by $$\frac{(V_{DD} - V_{M(H)}) C_P}{I_N}$$

This start-up time is varied by the current $I_N$ depending on the size of the NMOS transistor 328.

The midpoint voltage is a voltage where the input voltage and the output voltage of the inverter are equal in the voltage transfer characteristic. At the midpoint voltage, the transistors of the inverter operate in the saturation mode. This midpoint voltage of inverter is expressed as $$\frac{V_{DD} - V_{T_n} - |V_{T_p}|}{1 + \sqrt{\frac{K_n}{K_p}}} + V_{T_n} \text{ where}$$

$$\frac{K_n}{K_p} = \frac{\mu_n C_{OX} \left(\frac{W}{L}\right)_n}{\mu_p C_{OX} \left(\frac{W}{L}\right)_p}$$

In design of the basic smart start-up circuit of FIG. 3, it is also desirable to use a value for the lower midpoint voltage, $V_M$, less than $V_{OUT}'$ and a value for the higher midpoint voltage, $V_{M(H)}$, greater than $V'_{OUT}$. $V'_{OUT}$ is the output voltage level that reaches the equilibrium in switching regulators.

Figure 4:
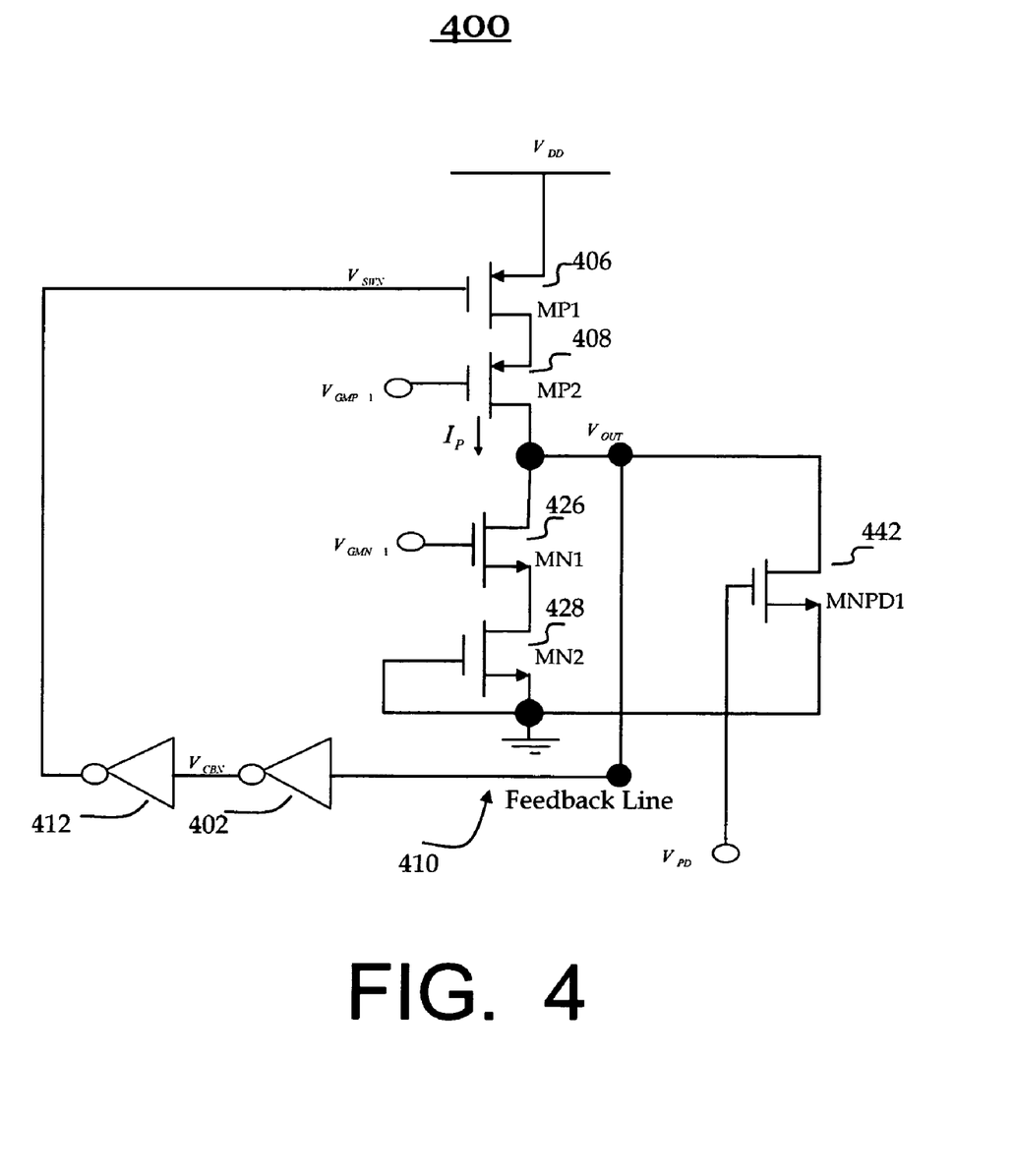
FIG. 4 illustrates a circuit diagram of a smart start-up circuit in accordance with the present invention.

FIG. 4 illustrates a smart start-up circuit 400 according to the present invention. A power-down input voltage, $V_{PD}$, is defined as the input voltage for power-down mode. The power-down enable system is in power-down mode when $V_{PD}$ is $V_{DD}$ and it is in normal mode when $V_{PD}$ is zero. The smart start-up circuit 400 is a feedback circuit that consists of lower-voltage sensing inverters 402 and 412 (i.e., an even number of inverters), two stacked PMOS transistors 406 and 408, two stacked NMOS transistors 426 and 428, a feedback line 410, and a power-down NMOS transistor 442. In addition, the gate terminal of a PMOS transistor 408 is connected to a proper fixed-bias voltage (not shown) or ground (e.g., "0", low, etc.). The gate terminal of a NMOS transistor 426 is connected to a proper fixed-bias voltage (not shown) or power supply voltage (e.g., $V_{DD}$, "1", high, etc.). Furthermore, the gate terminal of a NMOS transistor 428 is shorted and thus no current flows into the drains of the NMOS transistors 426 and 428.

The circuit mode changes from power-down mode to normal mode in FIG. 4. Since the first lower-voltage sensing inverter 402 initially senses a voltage less than the lower midpoint voltage of the first lower-voltage sensing inverter 402, the output voltage of the second lower-voltage sensing inverter 412 is low enough to turn on the PMOS transistor 406. The PMOS transistor 406 generates a current (i.e., $I_P$) to the output until the output voltage (i.e., $V_{OUT}$) goes up to the lower midpoint voltage of the first lower-voltage sensing inverter 402. Furthermore, assuming that $V_M$ is closer to the output voltage level that reaches the equilibrium in switching regulators, the start-up time of the switching regulators is approximately given by $$\frac{V_M C_P}{I_P}$$

Also, $V_M$ is the lower midpoint voltage determined by the device aspect ratios of the first lower-voltage sensing inverter 402 and $C_P$ is the value of the capacitor in the load. The start-up time is varied by the current $I_P$ depending on the size of the PMOS transistor 406.

In design of the smart start-up circuit of FIG. 4, it is also desirable to use a value for the lower midpoint voltage, $V_M$, less than $V'_{OUT}$. $V'_{OUT}$ is the output voltage level that reaches the equilibrium in switching regulators. The smart start-up circuit 400 is used for all types of switching regulators driving the load connected between $V_{OUT}$ and ground. Since the power-down NMOS transistor 442 is on during power-down mode, it provides an output pull-down path to ground. Thus, $V_{OUT}$ of the smart start-up circuit 400 is zero so that no current flows into the circuits during power-down mode.

Figure 5:
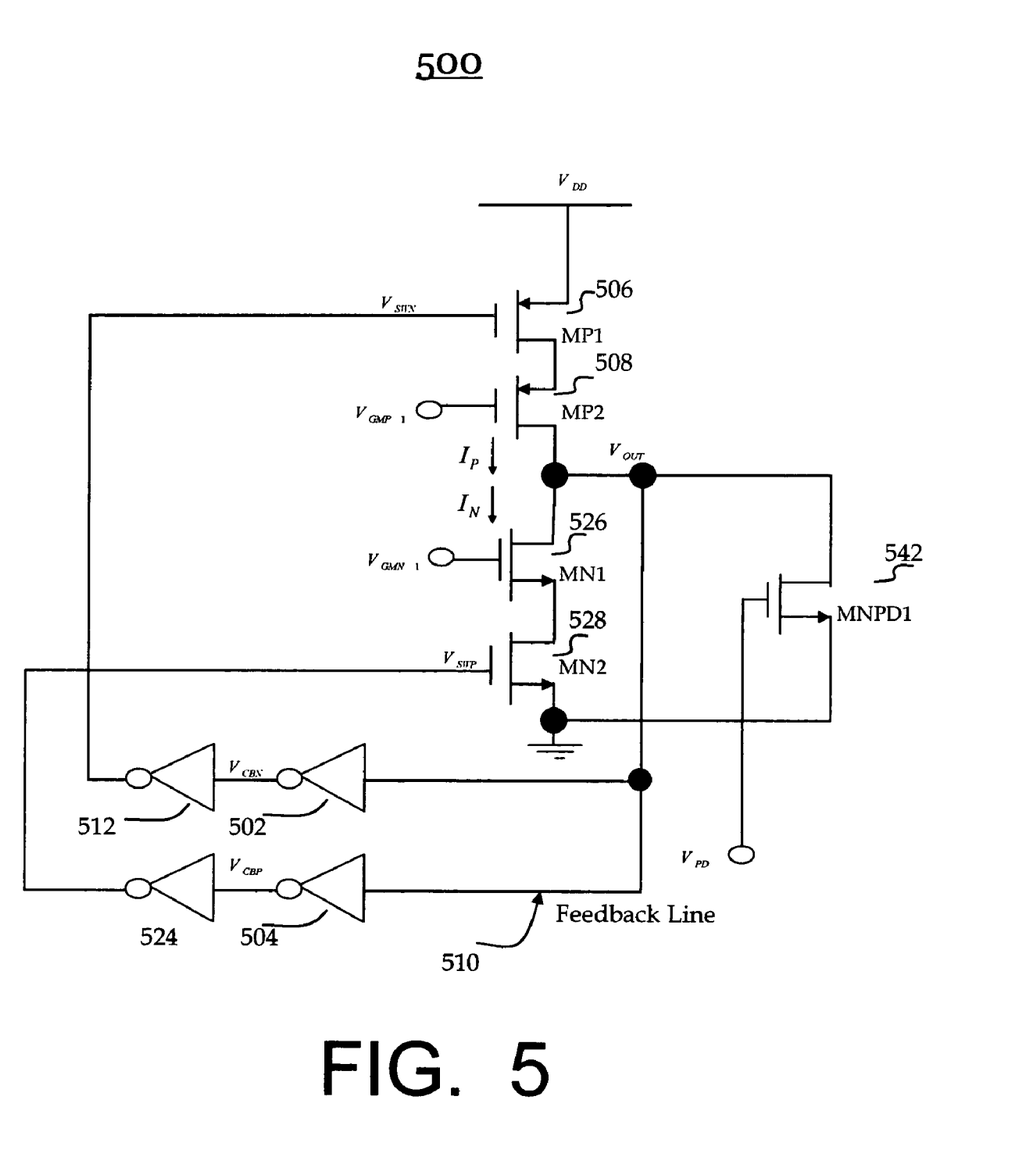
FIG. 5 illustrates a circuit diagram of a dual smart start-up circuit according to the present invention.

FIG. 5 illustrates a dual smart start-up circuit 500 in accordance with the present invention. The dual smart start-up circuit 500 is a modification of the circuit described in FIG. 4. The gate terminal of a PMOS transistor 508 is connected to a proper fixed-bias voltage (not shown) or ground (e.g., "0", low, etc.). The gate terminal of a NMOS transistor 526 is connected to a proper fixed-bias voltage (not shown) or power supply voltage (e.g., $V_{DD}$, "1", high, etc.). Furthermore, compared to FIG. 4, the first difference to note is that the higher-voltage sensing inverters 504 and 524 (i.e., an even number of inverters) are added into FIG. 5 in order to provide the higher-voltage sensing function. The second difference to note is that the output of the second higher-voltage sensing inverter 524 is connected to the gate terminal of a NMOS transistor 528. Therefore, the dual smart start-up circuit 500 is able to sense the lower-voltage as well as the higher-voltage while the smart start-up circuit 400 is able to sense only the lower-voltage.

No current flows into the drains of the NMOS transistors 526 and 528 assuming $V_{OUT} < V_{M(H)}$ where $V_{M(H)}$ is the higher midpoint voltage decided by the device aspect ratios of the first higher-voltage sensing inverter 504. If $V_{OUT}$ is greater than $V_{M(H)}$, the gate voltage of the NMOS transistor 528 is $V_{DD}$. As a result, a current flows into the drains of the NMOS transistors 526 and 528 until $V_{OUT}$ goes down to $V_{M(H)}$.

In design of the dual smart start-up circuit of FIG. 5, it is also desirable to use a value for the lower midpoint voltage, $V_M$, less than $V'_{OUT}$ and a value for the higher midpoint voltage, $V_{M(H)}$ greater than $V'_{OUT}$. $V'_{OUT}$ is the output voltage level that reaches the equilibrium in switching regulators. $V_M$ is the lower midpoint voltage decided by the device aspect ratios of the first lower-voltage sensing inverter 502. The dual smart start-up circuit 500 is used for all types of switching regulators driving the load connected between $V_{OUT}$ and ground. Zero dc volt at $V_{OUT}$ ensures that no current flows into the circuits during power-down mode.

Figure 6:
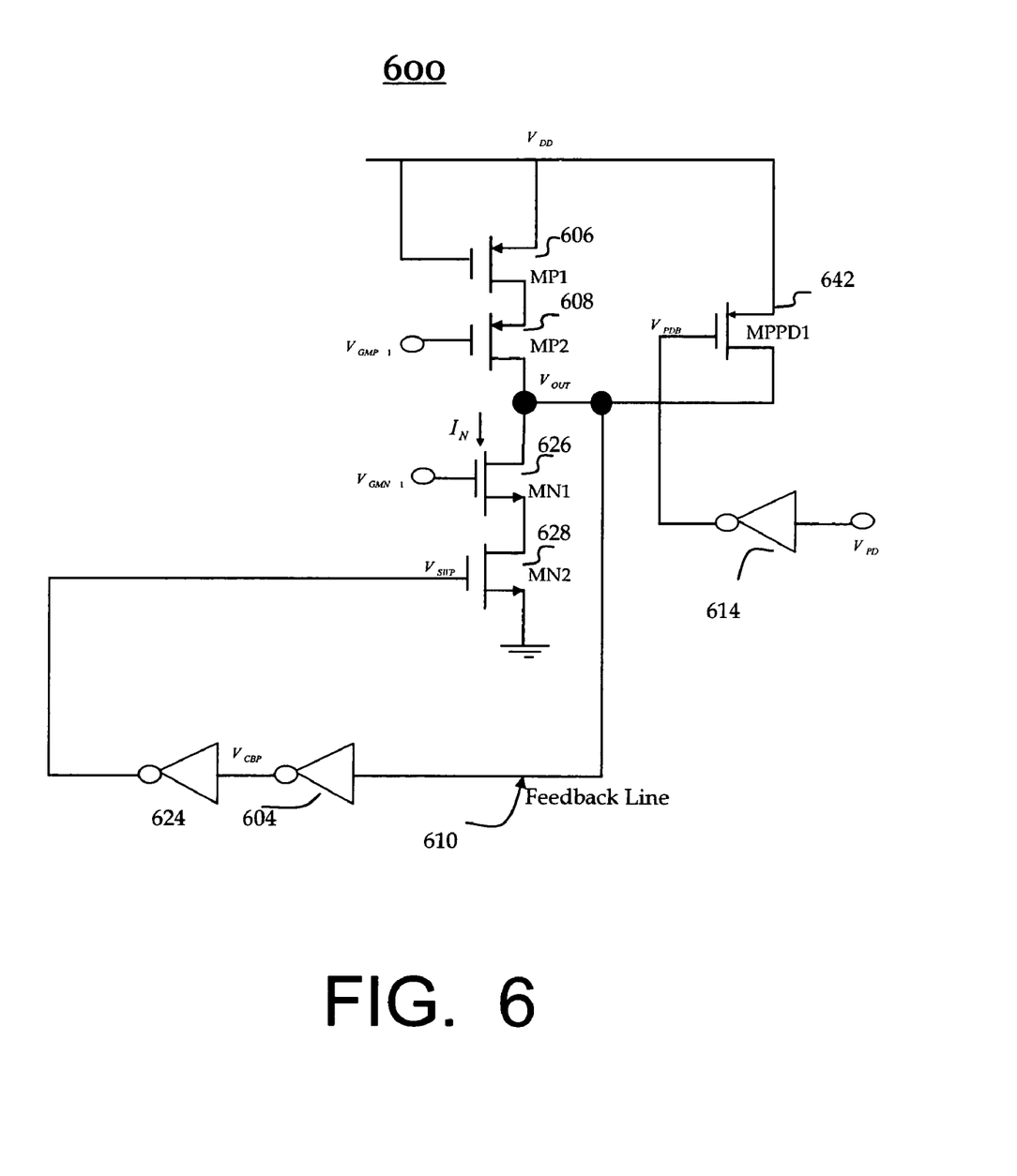
FIG. 6 illustrates a circuit diagram of a p-type smart start-up circuit in accordance with the present invention.

FIG. 6 illustrates a p-type smart start-up circuit 600 according to the present invention. The power-down input voltage, $V_{PD}$, is defined as the input voltage for the p-type power-down mode as well as for the power-down mode. The p-type power-down enable system is in power-down mode when $V_{PD}$ is $V_{DD}$ and it is in normal mode when $V_{PD}$ is zero. The p-type smart start-up circuit 600 is a feedback circuit that consists of a higher-voltage sensing inverters 604 and 624 (i.e., an even number of inverters), two stacked PMOS transistors 606 and 608, two stacked NMOS transistors 626 and 628, a feedback line 610, a power-down inverter 614, and a power-down PMOS transistor 642. In addition, the gate terminal of a PMOS transistor 608 is connected to a proper fixed-bias voltage (not shown) or ground (e.g., "0", low, etc.). The gate terminal of a NMOS transistor 626 is connected to a proper fixed-bias voltage (not shown) or power supply voltage (e.g., $V_{DD}$, "1", high, etc.). Furthermore, since the PMOS transistor 606 is turned off, no current flows out of the drains of the PMOS transistors 606 and 608.

The circuit mode changes from p-type power-down mode to normal mode in FIG. 6. Since the first higher-voltage sensing inverter 604 initially senses a voltage greater than $V_{M(H)}$, the output voltage of the second higher-voltage sensing inverter 624 is high enough to turn on the NMOS transistor 628. $V_{M(H)}$ is the higher midpoint voltage decided by the device aspect ratios of the first higher-voltage sensing inverter 604. The NMOS transistor 628 generates a current (i.e., $I_N$) to the output until the output voltage (i.e., $V_{OUT}$) goes down to $V_{M(H)}$. Assuming that $V_{M(H)}$ is closer to the output voltage level that reaches the equilibrium in switching regulators, the start-up time of the switching regulators is approximately given by $$\frac{(V_{DD} - V_{M(H)})C_P}{I_N}$$

Also, $C_P$ is the value of the capacitor in the load. The start-up time is varied by the current $I_N$ depending on the size of the NMOS transistor 628.

In design of the p-type smart start-up circuit of FIG. 6, it is also desirable to use a value for the higher midpoint voltage, $V_{M(H)}$, greater than $V'_{OUT}$. $V'_{OUT}$ is the output voltage level that reaches the equilibrium in switching regulators. The p-type smart start-up circuit 600 is used for all types of switching regulators driving the load connected between $V_{OUT}$ and power supply. The output voltage of the power-down inverter 614, $V_{PDB}$, is zero during power-down mode. As a result, the power-down PMOS transistor 642 is turned on and thus provides an output pull-up path to $V_{DD}$. Therefore, $V_{OUT}$ of the p-type smart start-up circuit 600 is $V_{DD}$ so that no current flows into the circuits during power-down mode. On the contrary, it was stated earlier that $V_{OUT}$, must be zero when power-down mode occurs in FIG. 4 and FIG. 5.

Figure 7:
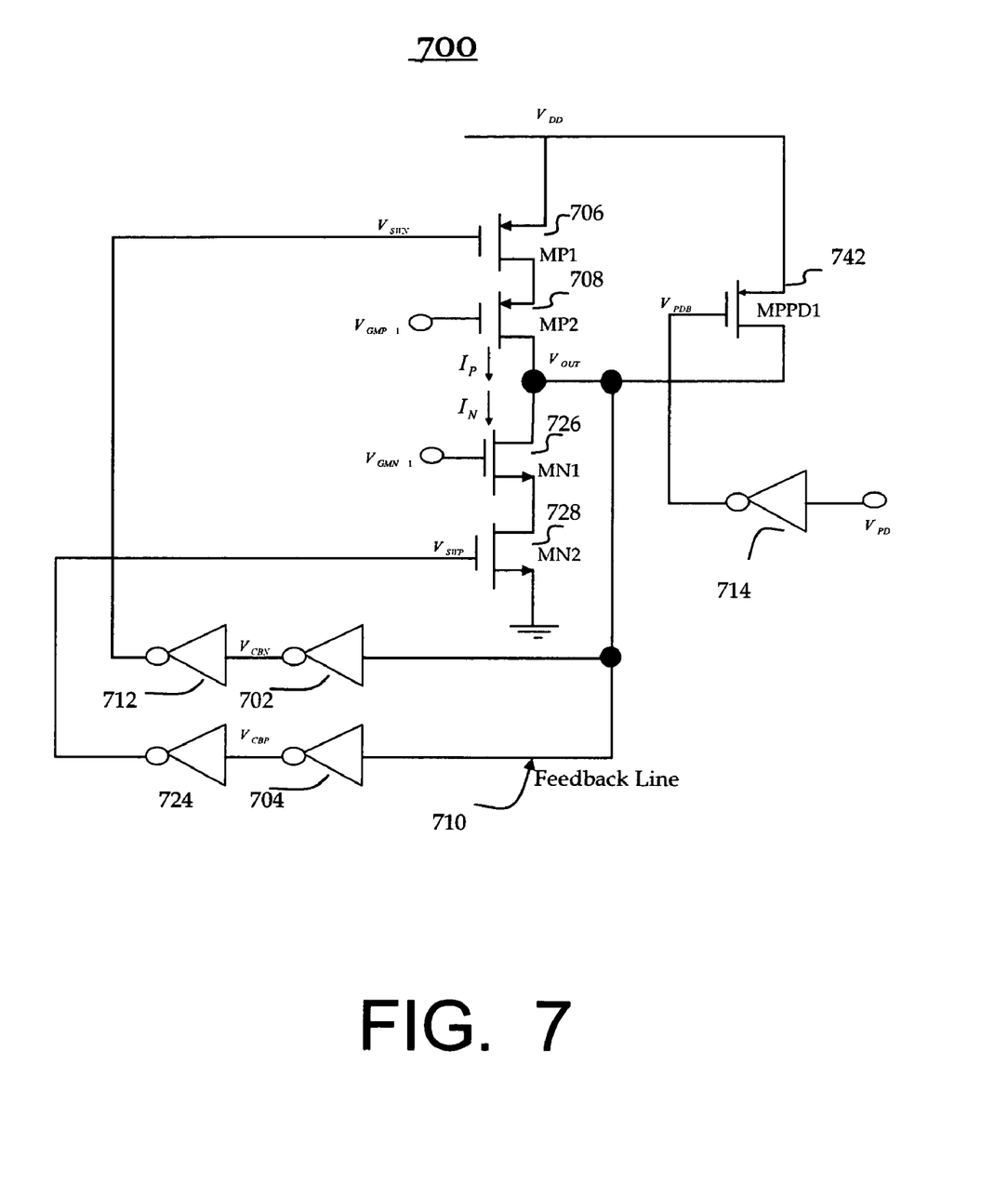
FIG. 7 illustrates a circuit diagram of a p-type dual smart start-up circuit according to the present invention.

FIG. 7 illustrates a p-type dual smart start-up circuit 700 in accordance with the present invention. The p-type dual smart start-up circuit 700 is a modification of the circuit described in FIG. 6. The gate terminal of a PMOS transistor 708 is connected to a proper fixed-bias voltage (not shown) or ground (e.g., "0", low, etc.). The gate terminal of a NMOS transistor 726 is connected to a proper fixed-bias voltage (not shown) or power supply voltage (e.g., $V_{DD}$, "1", high, etc.). Compared to FIG. 6, the first difference to note here is that the lower-voltage sensing inverters 702 and 712 (i.e., an even number of inverters) are added into FIG. 7 in order to sense the lower-voltage. The second difference to note here is that the output of the second lower-voltage sensing inverter 712 is connected to the gate terminal of the PMOS transistor 706. The p-type dual smart start-up circuit 700 is able to sense the lower-voltage as well as the higher voltage while the p-type smart start-up circuit 600 is able to sense only the higher voltage.

No current flows out of the drains of the PMOS transistors 706 and 708 if $V_{OUT}$ is greater than $V_M$. $V_M$ is the lower midpoint voltage decided by the device aspect ratios of the first lower-voltage sensing inverter 702. If $V_{OUT}$ is less than $V_M$, the PMOS transistor 706 is turned on until $V_{OUT}$ goes up to $V_M$. In design of the p-type dual smart start-up circuit of FIG. 7, it is also desirable to use a value for the higher midpoint voltage, $V_{M(H)}$, greater than $V'_{OUT}$ and a value for the lower midpoint voltage, $V_M$, less than $V'_{OUT}$. $V'_{OUT}$ is the output voltage level that reaches the equilibrium in switching regulators. The p-type dual smart start-up circuit 700 is used for all types of switching regulators driving the load connected between $V_{OUT}$ and power supply. $V_{OUT}=V_{DD}$ in the p-type dual smart start-up circuit 700 ensures that no current flows into the circuits during power-down mode.

In summary, the five smart start-up circuits of the present invention within switching regulators simply control how fast the output voltage level reaches the equilibrium from an initial output voltage level. The balance between PMOS output resistance and NMOS output resistance is important to obtain high output resistance. Furthermore, the CMOS process variations usually must be considered so that the proper value of the midpoint voltage is chosen for all the smart start-up circuits 300, 400, 500, 600, and 700. Each bulk of two stacked PMOS transistors can be connected to its own N-well to obtain better immunity from substrate noise in all the smart start-up circuits 300, 400, 500, 600, and 700.

The smart start-up circuit 214 shown in FIG. 2 represents the basic smart start-up circuit 300, the smart start-up circuit 400, and the dual smart start-up circuit 500, as shown in FIG. 3, FIG. 4, and FIG. 5, respectively. Also, the p-type smart start-up circuit 224 shown in FIG. 2 represents the basic smart start-up circuit 300, the p-type smart start-up circuit 600 and the p-type dual smart start-up circuit 700, as shown in FIG. 3, FIG. 6, and FIG. 7, respectively. The conventional switching regulator 100 and the switching regulator system 210 including the basic smart start-up circuit 300 are simulated using the same components. As a result, the total simulation time of the conventional switching regulator 100 is 40 hours and that of the switching regulator system 210 using $(W/L)_{MP1}=6u/1u$ of the PMOS transistor 306 is 3 hours. This improvement can be accomplished by simply inserting a proper one of the smart start-up circuits into any conventional switching regulator, and the simulation time can be reduced by a factor of 13. It should be noted that the same time step has been used for the SPICE simulation in order to accurately measure and compare the simulation time of all circuits.

All the smart start-up circuits of the present invention are very efficient to implement in system-on-chip (SOC) or integrated circuit (IC). The present invention provides five different embodiments which achieve a drastic improvement in a very fast start-up time, start-up time controllability, performance, time-to-market, power consumption, power and time management, efficiency, cost, and design time. While the present invention has been described in particular embodiments, it should be appreciated that the present invention should not be construed as being limited by such embodiments, but rather construed according to the claims below.

What is claimed is:

1. A smart start-up circuit for providing an initial output voltage level closer to an output voltage level of a switching regulator that reaches an equilibrium according to schedule, comprising:
    a feedback line connected with an output and an input of the smart start-up circuit, which become a single node coupled to a load, wherein the single node of the smart start-up circuit is connected to an output terminal of the switching regulator;
    a sensor for sensing a voltage at the output, comparing with the midpoint voltage of the sensor, and providing its output;
    two stacked PMOS transistors connected between a power supply and the output; and
    two stacked NMOS transistors connected between the output and ground.

2. The circuit as recited in claim 1 wherein the sensor is a low-voltage sensor which has an input and an output.

3. The circuit as recited in claim 2 wherein the low-voltage sensor's output is coupled to a gate terminal of an upper PMOS transistor of the two stacked PMOS transistors.

4. The circuit as recited in claim 1 wherein the sensor is a high-voltage sensor which has an input and an output.

5. The circuit as recited in claim 4 wherein the high-voltage sensor's output is coupled to a gate terminal of a lower NMOS transistor of the two stacked NMOS transistors.

6. The circuit as recited in claim 1 wherein the sensor is both a low-voltage sensor and a high-voltage sensor.

7. The circuit as recited in claim 6 wherein the low-voltage sensor's output is coupled to the gate terminal of the upper PMOS transistor and the high-voltage sensor's output is coupled to the gate terminal of the lower NMOS transistor.

8. The circuit as recited in claim 1 wherein the sensor is an even number of inverters.

9. The circuit as recited in claim 1 wherein the sensor is a comparator which has an input and an output.

10. The circuit as recited in claim 1 further comprising a power-down NMOS transistor so that the power-down NMOS transistor provides an output pull-down path to ground when a power-down input voltage is high during power-down mode.

11. The circuit as recited in claim 10 wherein the output of the smart start-up circuit is coupled to a load connected between the output and ground and also coupled to the output terminal of the switching regulator.

12. The circuit as recited in claim 10 wherein the output of the smart start-up circuit is at ground when the power-down NMOS transistor has a gate terminal which is connected to the power-down input.

13. The circuit as recited in claim 1 further comprising a power-down PMOS transistor and a power-down inverter so that the power-down PMOS transistor provides an output pull-up path to the power supply when a power-down input voltage is high during power-down mode.

14. The circuit as recited in claim 13 wherein the output of the smart start-up circuit is coupled to a load connected between the output and the power supply and also coupled to the output terminal of the switching regulator.

15. The circuit as recited in claim 13 wherein the output of the smart start-up circuit is at the power supply when the power-down PMOS transistor has a gate terminal which is inverted from the power-down input through the power-down inverter.

16. The circuit as recited in claim 13 wherein the power-down inverter used in the smart start-up circuit is an odd number of inverters.

17. The circuit as recited in claim 1 wherein the smart start-up circuit is developed for use in all switching regulators without regard to architectures, topologies, and schematics.

* * * * *